United States Patent
O'Doherty et al.

(10) Patent No.: US 11,675,820 B2
(45) Date of Patent: Jun. 13, 2023

(54) BUILDING AND MODIFYING CONVERSATIONAL USER JOURNEYS

(71) Applicant: International Business Machines Corporation, Armonk, NY (US)

(72) Inventors: Simon Peter O'Doherty, Dubai (AE); Omar Megawer, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 17/081,422

(22) Filed: Oct. 27, 2020

(65) Prior Publication Data
US 2022/0129489 A1    Apr. 28, 2022

(51) Int. Cl.
*G06F 16/332*    (2019.01)
*G06N 20/00*    (2019.01)

(52) U.S. Cl.
CPC ........... *G06F 16/332* (2019.01); *G06N 20/00* (2019.01)

(58) Field of Classification Search
CPC ........... G06F 11/3438; G06F 16/90332; G06F 16/332; G06F 16/90324; G06N 3/08; G06N 20/00
See application file for complete search history.

(56) References Cited

U.S. PATENT DOCUMENTS

| | | |
|---|---|---|
| 9,400,841 B2 | 7/2016 | Eggebraaten et al. |
| 9,947,319 B1 | 4/2018 | Horling et al. |
| 11,107,006 B2 * | 8/2021 | Eisenzopf ............... G06N 5/04 704/9 |
| 2006/0259473 A1 * | 11/2006 | Li .......................... G06Q 30/02 707/999.003 |
| 2014/0122083 A1 | 5/2014 | Xiaojiang |
| 2014/0122407 A1 | 5/2014 | Duan |
| 2014/0122619 A1 | 5/2014 | Duan |
| 2016/0071517 A1 * | 3/2016 | Beaver ................... G06F 40/35 704/9 |
| 2016/0124951 A1 | 5/2016 | Barker et al. |

(Continued)

FOREIGN PATENT DOCUMENTS

| | | | | |
|---|---|---|---|---|
| CN | 114375449 A | * | 4/2022 | ....... G06F 16/90332 |
| DE | 102017122200 A1 | | 3/2018 | |

OTHER PUBLICATIONS

"Tay (bot)," Wikipedia, Printed: Dec. 12, 2019, 3 pgs, https://en.wikipedia.org/wiki/Tay_(bot).

(Continued)

*Primary Examiner* — Yuk Ting Choi
(74) *Attorney, Agent, or Firm* — Mark Bergner

(57) ABSTRACT

A computer-implemented system and method for searching comprises, in an initial training phase, storing a plurality of user journeys in a stored journey database (SJDB), and storing a plurality of intents in a stored intents database (SIDB). The plurality of user journeys comprise a plurality of intents linked together by weighted links. In a first use phase, the method comprises determining a first intent of a first user or a second user, and modifying a first weighting of the weightings based on the first intent. In a second use phase, the method comprises receiving, from the second user, a second user question, determining a second intent from the second user question, and locating a user journey from the plurality of user journeys in the SJDB related to the second intent.

20 Claims, 8 Drawing Sheets

(56) References Cited

U.S. PATENT DOCUMENTS

| | | | |
|---|---|---|---|
| 2016/0283463 A1* | 9/2016 | M R | G06F 16/243 707/999.003 |
| 2018/0203572 A1 | 7/2018 | Jiang et al. | |
| 2018/0260384 A1 | 9/2018 | Pasupalak et al. | |
| 2018/0337872 A1 | 11/2018 | Fawcett | |
| 2019/0243899 A1 | 8/2019 | Yi et al. | |
| 2019/0251959 A1* | 8/2019 | Engles | H04M 3/523 704/9 |
| 2020/0117858 A1* | 4/2020 | Freeman | G06F 40/30 704/9 |
| 2020/0265339 A1* | 8/2020 | Eisenzopf | G06N 3/006 704/9 |
| 2021/0374353 A1* | 12/2021 | Zhang | G06F 40/30 704/9 |

OTHER PUBLICATIONS

Lewis, B.A., "Chatbots—mapping the user journey," Feersum-Engine, Nov. 29, 2017, 23 pages, downloaded from the following website: https://medium.com/feersum-engine/chatbots-mapping-the-user-journey-5a55a1265b81.

Mell, P. et al., "The NIST Definition of Cloud Computing", Recommendations of the National Institute of Standards and Technology, NIST Special Publication 800-145, 7 pages, Sep. 2011.

* cited by examiner

USER JOURNEY TRIGGERED BY INTENT

BUILDING AND MODIFYING CONVERSATIONAL USER JOURNEYS

BACKGROUND

Disclosed herein is a system and related method for building and using conversational user journeys that are dynamic and changeable as users interact with the system.

SUMMARY

According to one aspect disclosed herein, a computer-implemented method is provided comprising, by a processor in an initial training phase, storing a plurality of user journeys in a stored journey database (SJDB) located within a memory associated with the processor, and storing a plurality of intents in a stored intents database (SIDB) located within the memory. The plurality of user journeys comprise a plurality of intents linked together by links that have weightings associated with the link. In a first use phase that is subsequent to the initial training phase, the method comprises determining a first intent of a first user or a second user, and modifying a first weighting of the weightings based on the first intent. In a second use phase that is subsequent to the first use phase, the method comprises receiving, from the second user, a second user question, determining a second intent from the second user question, and locating a user journey from the plurality of user journeys in the SJDB related to the second intent. The method concludes by presenting, on a display device, the user journey to the second user, wherein the user journey comprises at least two of the plurality of intents in the SIDB connected with a link having the modified first weighting.

According to another aspect disclosed herein, a conversation system is provided, comprising a processor configured to, in an initial training phase, store a plurality of user journeys in a stored journey database (SJDB) located within a memory associated with the processor, and store a plurality of intents in a stored intents database (SIDB) located within the memory. The plurality of user journeys comprise a plurality of intents linked together by links that have weightings associated with the link. In a first use phase that is subsequent to the initial training phase, the system determines a first intent of a first user or a second user, and modifies a first weighting of the weightings based on the first intent. In a second use phase that is subsequent to the first use phase, the system receives, from the second user, a second user question, determines a second intent from the second user question, and locates a user journey from the plurality of user journeys in the SJDB related to the second intent. The system then presents, on a display device, the user journey to the second user, wherein the user journey comprises at least two of the plurality of intents in the SIDB connected with a link having the modified first weighting.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
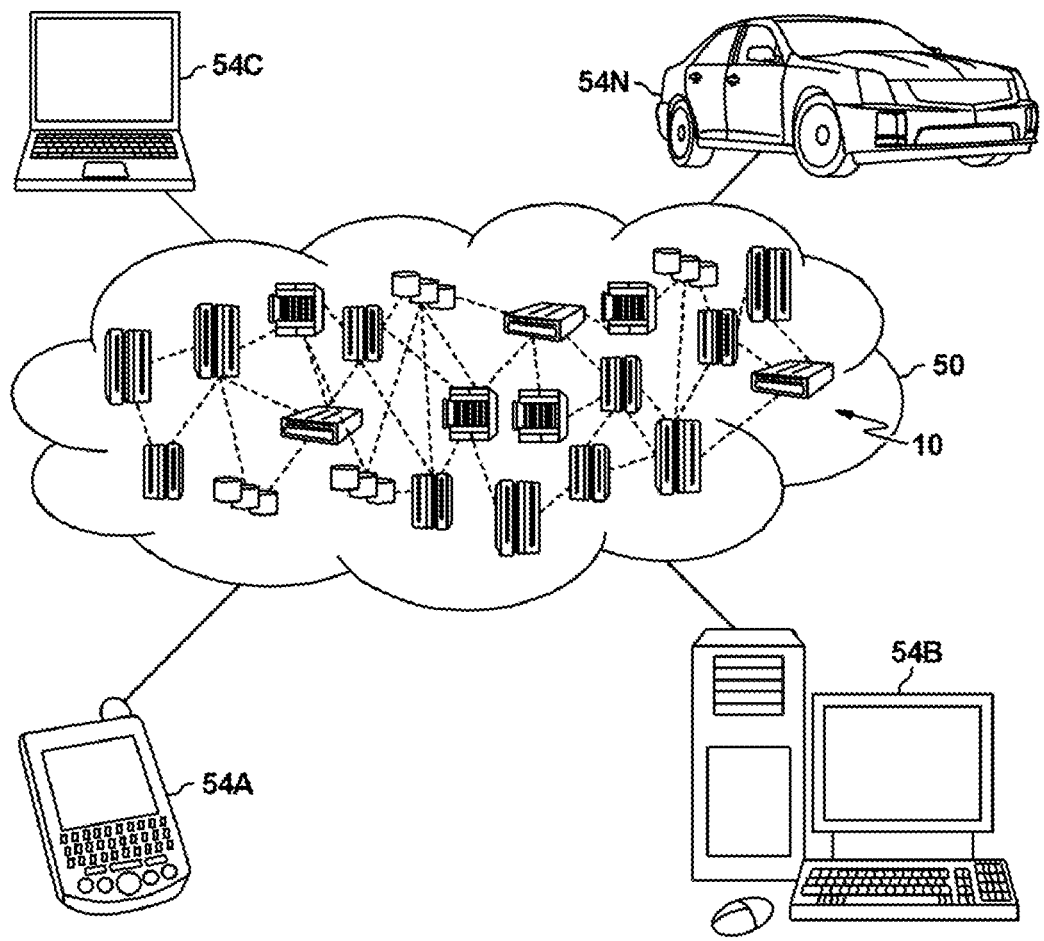
FIG. 1 depicts a cloud computing environment according to an embodiment of the present invention.

In order to provide a dynamic conversation system to users, a system and method are disclosed herein that allow conversational journeys to be developed by a subject matter expert, and then evolved during use. The conversational journeys may make use of a neural network to help evolve the journey. The system utilizes user interactions to assign weights to links connecting the nodes (intents) making up a journey, which may be used to modify pre-existing journeys stored in a journey database. The system may also be used to broaden out an initial user inquiry and permit a user to select which journey is of interest to them.

The following acronyms may be used below:
API application program interface
ARM advanced RISC machine
CD-ROM compact disc ROM
CMS content management system
CoD capacity on demand
CPU central processing unit
CUoD capacity upgrade on demand DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SIDB stored intent database
SJDB stored journey database
SLA service level agreement
SME subject matter expert
SRAM static random-access memory
WAN wide-area network Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
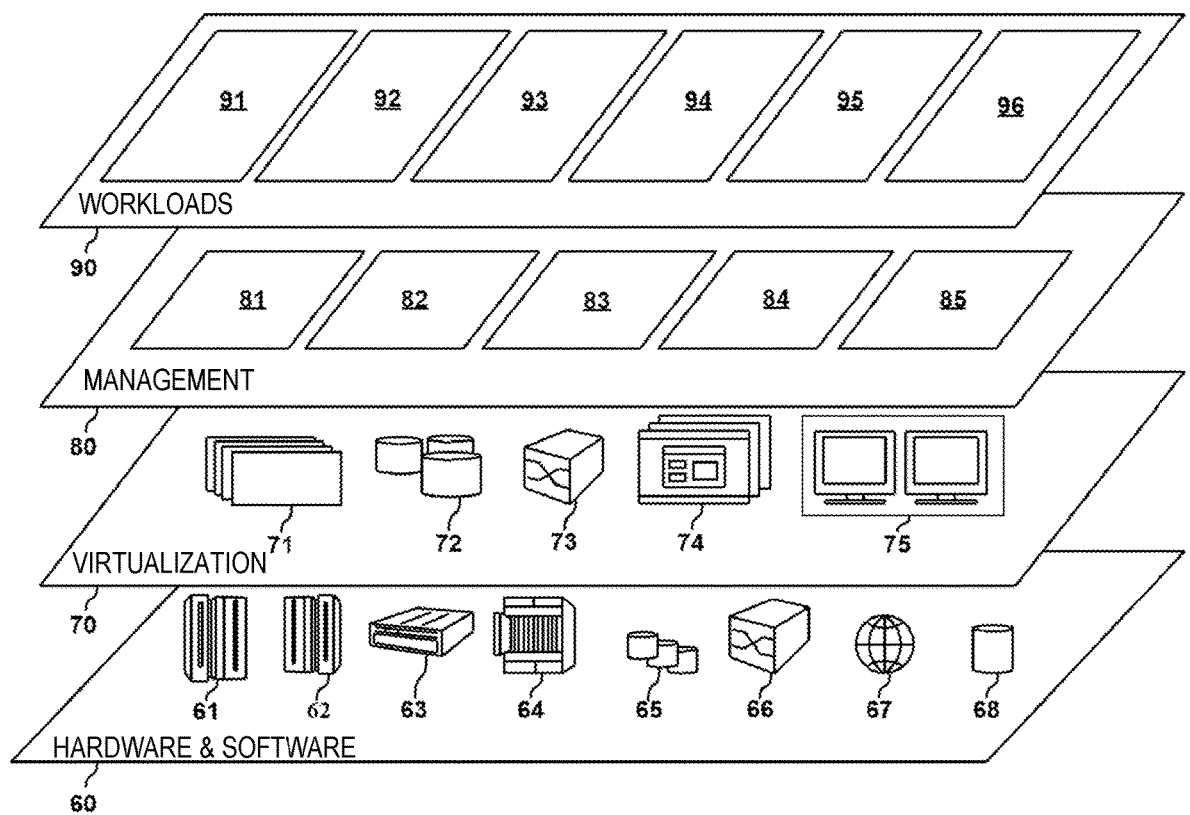
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
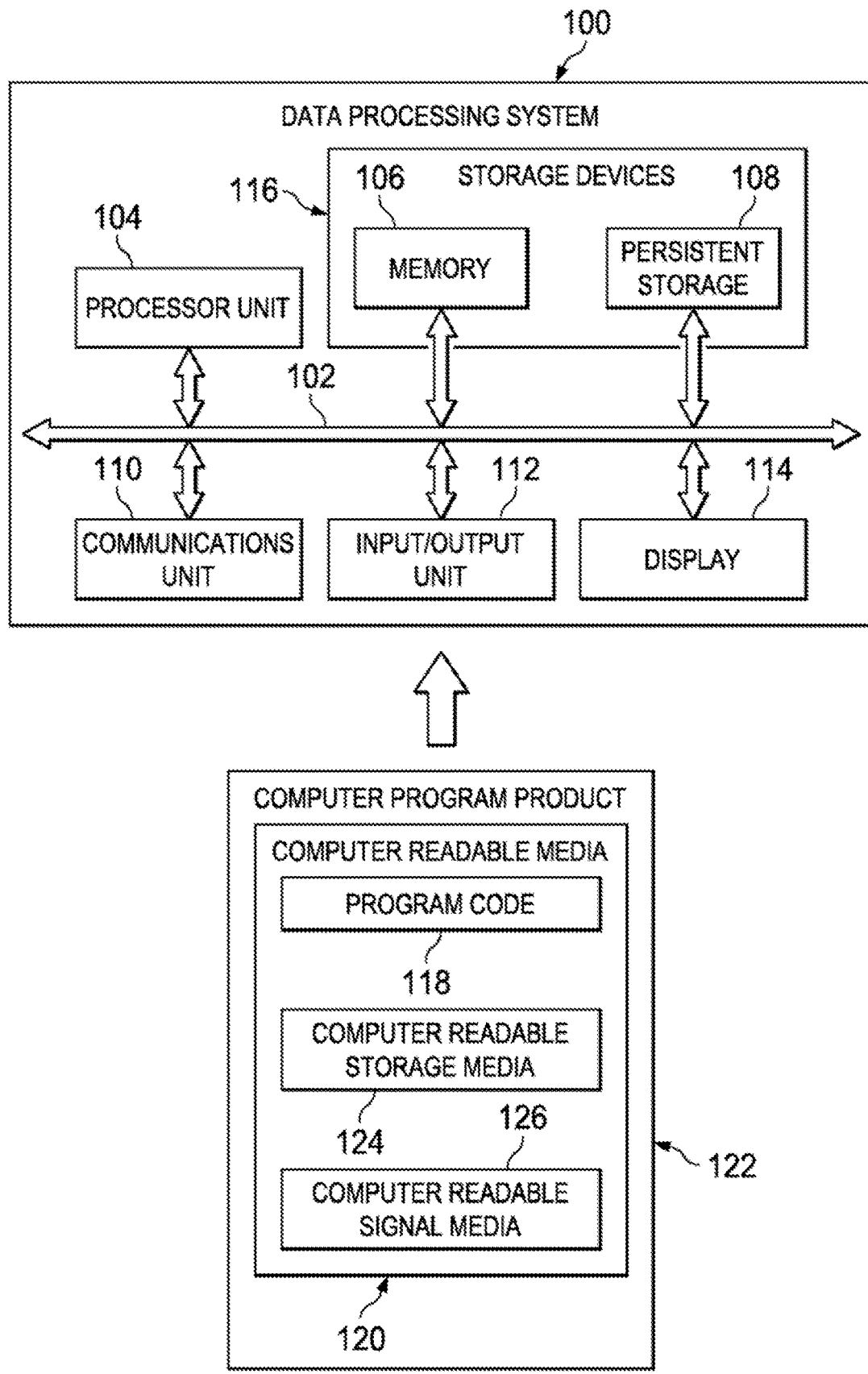
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present invention may be a system, a method, and/or a computer program product at any possible technical detail level of integration. The computer program product may include a computer readable storage medium (or media) having computer readable program instructions thereon for causing a processor to carry out aspects of the present invention.

Machine Learning—Neural Network

Figure 4:
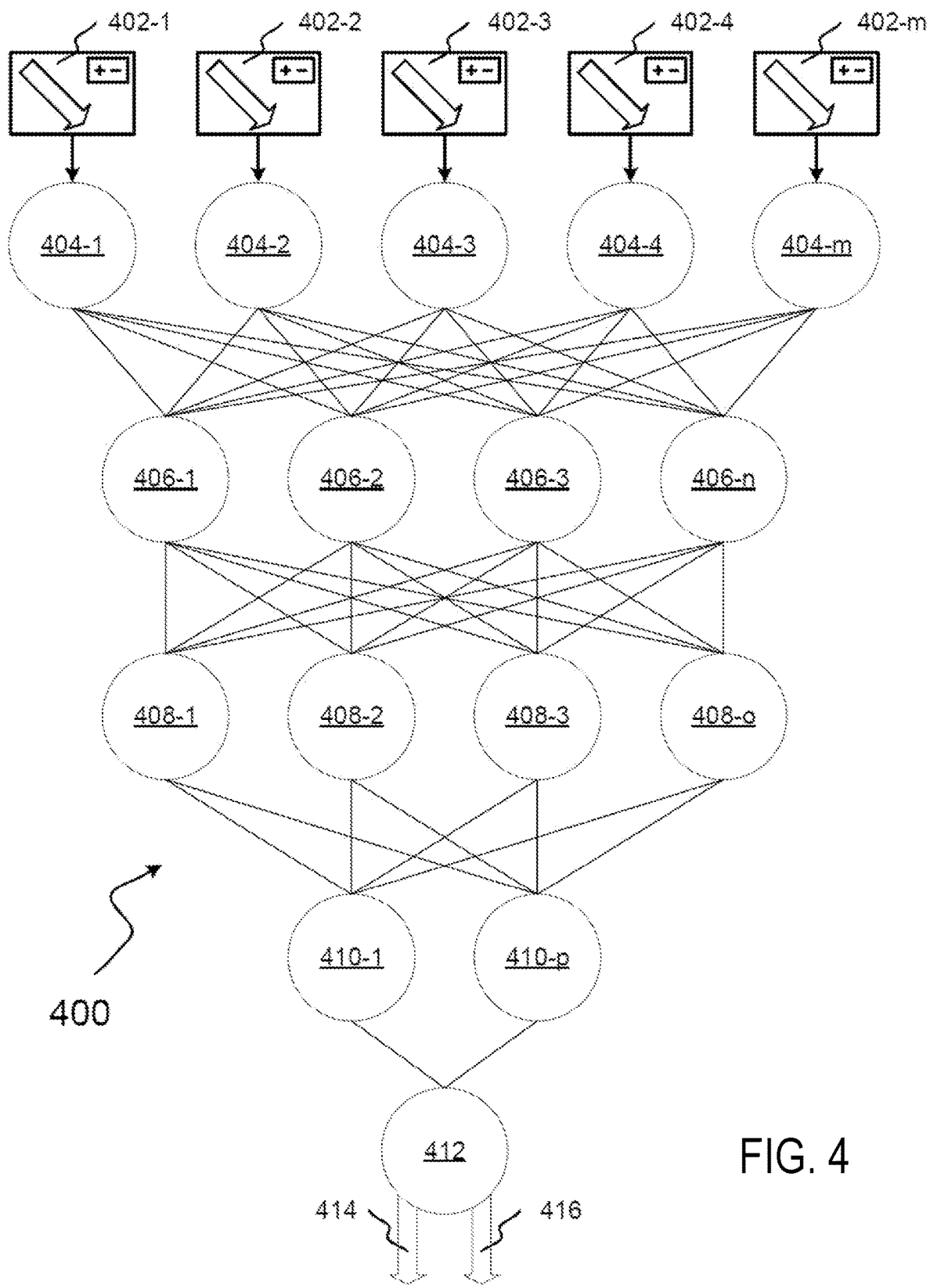
FIG. 4 is a node diagram that depicts an example neural network that may be specialized to train one or more learning models that may be used to identify query intents and/or result semantics.

FIG. 4 is a node diagram that depicts an example neural network 400 that may be specialized to train one or more learning models that may be used to identify query intents and/or result semantics.

The neural network 400 may be a classifier-type neural network, or convolutional neural network, and the neural network 400 may be part of a larger neural network. For example, the neural network 400 may be nested within a single, larger neural network, connected to several other neural networks, or connected to several other neural networks as part of an overall aggregate neural network.

Inputs 402-1 through 402-*m* represent the inputs to the neural network 400. In this embodiment, the inputs 402-1 through 402-*m* do not necessarily represent different inputs. Rather, the inputs 402-1 through 402-*m* represent the same input that is sent to each first-layer neuron (neurons 404-1 through 404-*m*) in the neural network 400. In some embodiments, the number of inputs 402-1 through 402-*m* (i.e., the number represented by m) may equal (and thus be determined by) the number of first-layer neurons in the network. In other embodiments, the neural network 400 may incorporate one or more bias neurons in the first layer, in which case the number of inputs 402-1 through 402-*m* may equal the number of first-layer neurons in the network minus the number of first-layer bias neurons. In some embodiments, a single input (e.g., input 402-1) may be input into the neural network. In such an embodiment, the first layer of the neural network 400 may comprise a single neuron 402, which may propagate the input to the second layer of neurons.

The inputs 402-1 through 402-*m* may comprise one or more values correlating to types of categories of intents and/or categories of result semantics. The illustrated neural network 400 comprises five layers of neurons (referred to as layers 404, 406, 408, 410, and 412, respectively corresponding to illustrated nodes 404-1 to 404-*m*, nodes 406-1 to 406-*n*, nodes 408-1 to 408-*o*, nodes 410-1 to 410-*p*, and a node 412). In some embodiments, the neural network 400 may have more than five layers or fewer than five layers. Each layer may comprise the same number of neurons as any other layer, more neurons than any other layer, fewer neurons than any other layer, or more neurons than some layers and fewer neurons than other layers.

In the embodiment illustrated in FIG. 4, the layer 412 is treated as the output layer. The layer 412 may output a probability (e.g., the likelihood that the semantics relate to a certain intent). In the embodiment illustrated in FIG. 4, no bias neurons are shown in the neural network 400. However, in some embodiments, each layer in the neural network 400 may contain one or more bias neurons. Although the layer 412 is shown having one output neuron (the node 412), in other embodiments, the layer 412 contains more than one output neuron.

The layers 404-412 may each comprise an activation function. The activation function utilized may be, for example, a rectified linear unit (ReLU) function, a SoftPlus function, a Soft step function, or others. Each layer may use the same activation function but may also transform the input or output of the layer independently of, or dependent upon, the ReLU function. This is also true in embodiments with more or fewer layers than are illustrated here.

The layer 412 is the output layer. In this embodiment, the neuron 412 produces outputs 414 and 416. The outputs 414 and 416 represent complementary probabilities that a target event will or will not occur (or that a result is more likely linked to a specific intent). In some embodiments, outputs 414 and 416 represent the overall confidence score, and/or type confidence scores. In some embodiments, there is an output node for each type confidence score. In some embodiments, there is an output node for the overall confidence score. In some embodiments, the outputs 414 and 416 may each be between 0.0 and 1.0 and may add up to 1.0. In such embodiments, a probability of 1.0 may represent a projected absolute certainty (e.g., if the output 414 were 1.0, the projected chance that the target event will occur is 100%, whereas if the output 416 were 0.0, the projected chance that the target event will not occur is 100%).

User Journey

Users often acquire information in a particular context/setting by utilizing a computer-based conversation system for a simple question and answer response, but in many cases it is normal for the user to not fully understand the context or related information with respect to their question (i.e., they do not know, what they do not know). For example, a person moving to a new country may utilize the conversation system to ask the most common questions (questions about a visa, housing, schools, utilities, etc.).

However, there may be a range of topics that are related or important for a given context, but that the user is not aware of (e.g., certain traffic laws, certain job-related requirements). The user may not understand the importance of certain topics, even if these topics are mentioned in the conversation system documentation.

For some conversation systems, a series of related conversational elements may be presented to the user in what is known as a "user journey". User journeys are a useful feature for conversation systems, providing a series of interactive steps, and represent the experiences a user has when utilizing/interacting with the system. User journeys may describe, at a high level of detail, what steps different users may take to complete a specific task or learn about a particular topic within a system, application, or website. This technique may utilize a current "as-is" user workflow, and provide areas of improvement for the "to-be" workflow.

User journeys may be assembled by a subject matter expert (SME), the assembly typically being a manual process of first understanding an overall journey, and then scripting it as a collection of linked intents for the end user. The SME is a person who is familiar with the subject matter and has insight into what new persons unfamiliar with the subject matter may inquire about. It is possible to create simple user journeys by analyzing the usage of the end users, however there are challenges in doing this. First, without human intervention, the conversation system may be open to adversarial attacks on the learning model. Such attacks may be mitigated by having the SME define the user journeys. Second, user journeys, or parts thereof, may have an overlap with parts of other user journeys, and the system may beneficially utilize a knowledge of which journey the user is on and where they are at in their particular journey, even if they are on an overlapping part of that journey. Without this, it may be difficult at any point in time to determine where and what user journey the current user may be in. Third, the SME or other designer designing the user journey may not always be aware of the user's route through that journey. What the SME or other designer may perceive to be important may be less so to the user.

Figure 5:
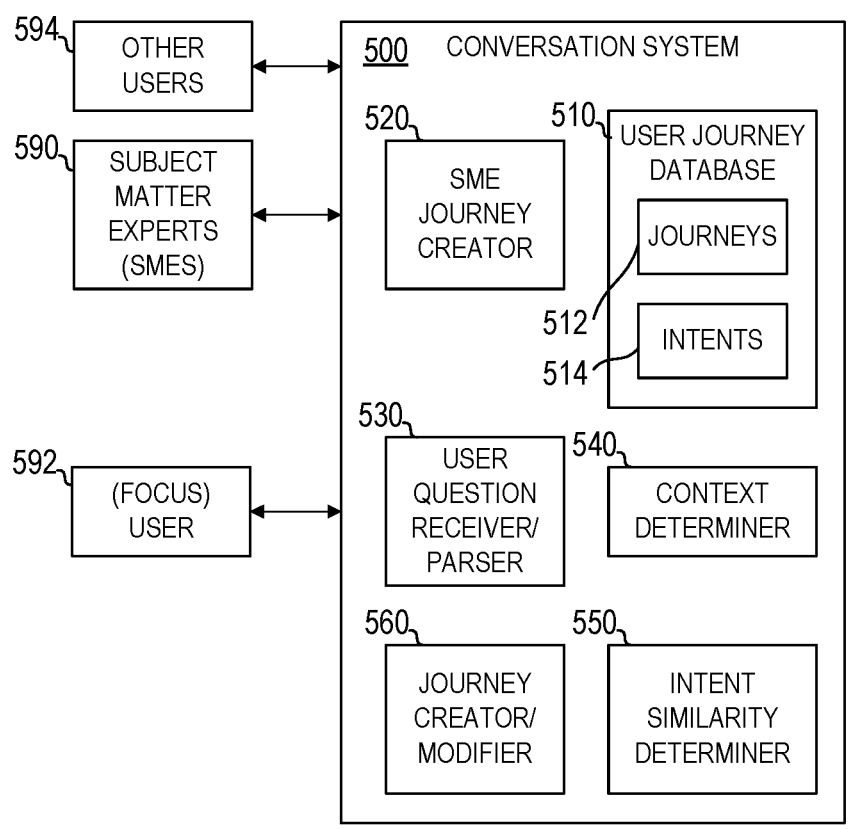
FIG. 5 is a block diagram of one or more embodiments of a conversation system, according to some implementations.

FIG. 5 is a block diagram of a conversation system 500. The conversation system may be implemented, in one embodiment, on a DPS 100 located within a cloud computing environment 50. According to some embodiments, the conversation system 500 may operate in the form of a question and answer bot, and that may automatically create or modify existing user journeys based on how SMEs 590 design, and how the users 592, 594 interact with, the conversation system 500. The other users 594 may be users who have interacted with the conversation system 500 after the training phase, and the (focus) user 592 may be a user who serves as a focal point for current activities being discussed herein. The conversation system 500 may include a user journey database 510 that comprises a plurality of stored journeys 512 along with a plurality of stored intents 514 that may be used to form the stored journeys 512. The conversation system 500 may further comprise an SME journey creator 520, a user question receiver/parser 530, a context determiner 540, an intent similarity determiner 550, and a journey creator/modifier 560.

Figure 6:
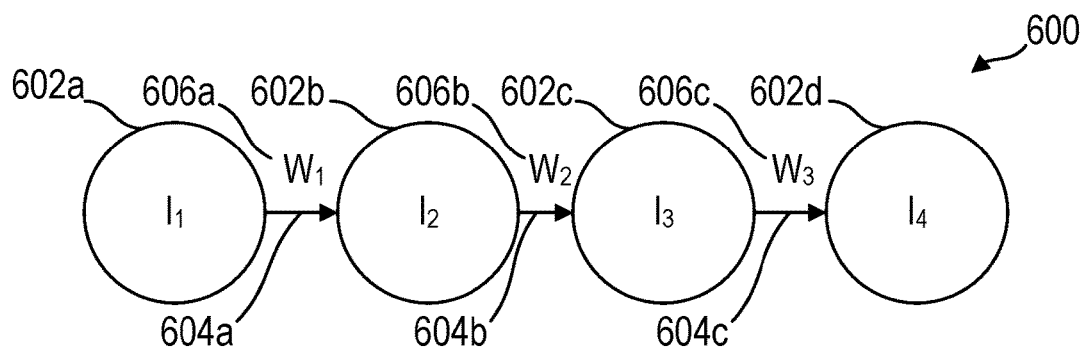
FIG. 6 is a graph illustrating an example of an SME manually-created journey or a conversation system-created journey, according to some implementations.

FIG. 6, discussed in more detail below, illustrates an example of a user journey 600 comprising various intents (602a, b, c, d) that are linked together with links (604a, b, c) having associated weightings. (606a, b, c). These user journeys 600 may take into account the content of the journey or associated intents (as topics). The conversation system 500 may also reduce confusion that may occur when multiple journeys 600 overlap with each other. The neural network 400 may be utilized in evolving user journeys 600, as described herein.

The concept of intent may be utilized in conversation (question and answer) systems 500, which, briefly, may be described as the topic or goal a user has in mind when entering a questions or comment—put differently, it is what the user is ultimately looking for. Although a user might use a particular entity or phrasing as a modifier to describe their issue in a question (e.g., "connect the plumbing"), the intent is what the user really means or intends (e.g., "turn on the water service"). An intent is a need of what the user may want. An answer unit is one or more answers mapped to the intent. By way of example, the question, "What the status of ticket X?" may yield a different answer depending on whether the user asking the question is a business customer, support personnel, manager, etc. The intent of a user question may be determined by, e.g., the user question receiver/parser 530, as described herein.

The user journey database 510 may comprise a plurality of stored journeys 512 that may be viewed as a stored journey database (SJDB) that may have been created during an initial training phase from a plurality of stored intents 514 that may also make up the user journey database 510. The stored intents 514 may be viewed as a stored intent database (SIDB). In some embodiments, the stored journeys 512 may be created by the SME 590 using the SME journey creator 520. The SME journey creator 520 may present various related stored intents 514 to the SME 590. The SME 590 may then link the stored intents 514 and their associated answers together and possibly assign weightings to the links. This may be accomplished, e.g., by a drag and drop user interface with a search capability to locate and associate relevant stored intents 514. In other embodiments, the stored journeys 512 may be created automatically using the journey creator/modifier 560. The relatedness of the intents may be determined by the intent similarity determiner 550 using mechanisms discussed herein. The stored intents 514 may have stored answers that are associated with them.

In some embodiments, the user 592 interacts with stored journeys 512. When the user 592 enters a question, the question may be received by the user question receiver/parser 530 and processed to create an intent of the user. The processed user intent may be one that already exists in the stored intents 514 of the user journey database 510, or be one that is new and that may be added to the other stored intents 514. The stored journeys 512 may be ones that were initially created by the SME 590, or they may be ones that may have been modified. The modifications may have been performed by the journey creator/modifier 560 based on interactions with other users 594 or by the user 592 themselves in past interactions with the conversation system 500. However, in other embodiments, the stored journeys 512 may be been created from scratch by the journey creator 560 utilizing the intent similarity determiner 550.

Example use cases may illustrate some of the principles discussed herein. In a first use case, Jane, a new user with no previous interaction with the conversation system 500 starts the user journey 600 at the start of the first question. Jane has just purchased a new home in a new location and is interacting with a "Welcome to Springfield" web page provided by the city. The following forced user journey 600 has been created by and SME 590 based on how previous other users 594 had interacted with the conversation system 500.

```
Bot (conversation system 500) > Hi, how can I help you?
Jane > How do I get the water switched on in my new home?
Bot > To get your water activated you will need to . . .
Use Case 1
Simple SME-Created Journey
```

However, such forced user journeys 600 may be troublesome to maintain, as users 592 may have their own perception of a journey 600. In the above example, the SME 592 focuses solely on a narrow intent, i.e., the user's 592 intention to activate her new home's water service.

However, a dynamic user journey 600, as disclosed herein, may make the user journey adaptable over time and in different contexts, and considering different possible intents for different contexts. Contexts may help to distinguish, e.g., whether the water is to be turned on after a service shutoff for an existing customer versus turned on after the home has been sold. For example, the dynamic user journey may factor in how multiple responses interact with or are related to each other, both by users and the SMEs training the system. The following dynamic user journey 600 illustrates a contextual understanding of a user's question (its intent), and the ability to provide a different intent within a context, such as taking a broader approach, in assisting the user. The conversation system 500 may present the possible different intent to the user 592 to see if the user 592 would like to follow a journey related to this different intent. The following user case illustrates an example of using a different (broader) intent.

```
Bot > Hi, how can I help you?
Jane > How do I get the water switched on in my new home?
Bot > Oh I see you are moving into a new home, I can help
you through the whole process. Would you like to do that?
Jane > What is required?
Bot > I can help guide you through multiple steps for
each of the following topics:
Finding a home or realtor
Utilities
TV & Internet
Insurance
Moving in
Use Case 2
Enhanced Journey
```

At this point, Jane can continue with the original question (Jane>No, I just need information about how to get the water switched on) or interact in more detail with the user journey (Jane>I'll need help with other utilities as well, but I've got the insurance covered).

In order to achieve such a different or broader experience for the user, in addition to an SME-created journey 600, the journey 600 may be dynamically created by an automated journey creator 560 that creates the journey 600 based on the user's question and based on evolving stored journeys 512 and stored intents 514 that may make up the stored journeys 512 present in a user journey database 510. The dynamic journey 600 and its components (linked intents, along with their associated answers) may be sorted and presented based on a number of factors.

First, the conversation system 500, in some embodiments utilizing the SME, may take into account a relationship within the content of each of the stored intents 514 and try to logically construct or graph the journey 600 by considering the relationship between two or more stored intents 514. For example, in Use Case 2 above, the conversation system 500 may consider a broader intent 514 than was considered in Use Case 1. In Use Case 1, the ultimate user intent was related to getting the water switched on in their new home, and thus, the SME-created journey took them through how to achieve this narrow goal.

However, for Use Case 2, the conversation system 500, using the context determiner 540 was able to take into account the content of the intent (using, e.g., words in the question or the determined intent of the question: "water", "switched on", "new home"), and, based on word relationships, determine that water is one type of several utility services utilized by homeowners. This may result in the expansion of the possible user intent 514 to not simply be starting the water service, but starting other utility services as well (e.g., Bot>Would you like information about switching on other utilities as well (gas, electric, sewer)?). In this situation, if the user 592 responds affirmatively, the journey 512 related to turning on the water simply becomes a sub-journey of the broader journey of switching on the utilities. In a similar manner, the context determiner 540 may consider an even broader intent and thus take into account the relationship that starting a utility is one of several issues that a new homeowner may wish to address. In this case, starting the utilities may become a sub-journey of the new home journey. By taking into account the content of the user's query and intent, and determining contexts and relationships for existing stored intents 514, a broader and fuller experience may be presented to the user 592.

Next, the conversation system 500 may further take into account how other users 594 have previously interacted with the conversation system 500. By way of example, the user 592 may ask about signing up for TV & Internet—although this may be a part of the Use Case 2 journey 512 above, the context determiner 540 may determine that this is not as important as other topics in the Use Case 2 journey 512 and thus, depending on various criteria, may not offer this part of a broader user journey 512 that is offered to the user 592. This determination may be made based on considering the user stored journeys 512 of other users 594 and their indicated preferences. For example, if users rarely want to view information about TV & Internet when inquiring about utilities, a user query about TV & Internet may not trigger presenting a broader context to the user. In some implementations, a determination may be made as to where two user journeys may share common topics or intents. Here, an attempt may be made to disambiguate the user journeys and offer the most likely beneficial journey. By utilizing a dynamic journey 600 with a broader scope, the system 500 may be able to track overlapping components of various journeys. For example, the system 500 may be able to distinguish between a user who is in a "new home" journey vs. a different user who is just in a "switch on utilities" journey, even though the "new home" journey uses the "switch on utilities" journey as a sub-journey. The system 500 stores and tracks the particular journey a user is on despite the overlap—the particular journey may be user and context dependent.

As noted above, the conversation system 500 may be implemented in two phases. In a first training phase, the SME may provide initial training to the conversation system 500. In a second use phase, users may improve the model by interacting with the conversation system 500, based on what they ask.

Initial Training Phase

In the initial training phase, the SME 590 may start by training the conversation system 500, via the SME journey creator 520, with: a) answers for the related questions the users may ask; and b) a determination of the user intent. User intent may play a role in question-answering and dialog systems. Intent detection may be treated as a classification problem where the user's utterances may be labeled with predefined intents. Text classification may thus be applied for text processing and intent resolution.

The SME 590 may optionally do one or more of the following via the SME journey creator 520: 1) add metadata; 2) link a before and after answer to build a journey; and 3) link (as before) but lock that part of the journey so that it cannot be changed. These functions may be performed using the intent similarity determiner 550.

Once content is created, the conversation system 500, via the intent similarity determiner 550, may attempt to look for similarities of the focus intent being considered with other stored intents 514 and their associated answer units stored in the user journey database 510 to determine an initial flow of the journey 512 in addition to being performed during the initial training phase, this may be done in the use phase. The similarities may be determined, for example, by calculating a term frequency in the answer units and calculating, e.g., the cosine similarity between both units. This helps generate a similarity score of how close the focus intent and the stored intent being compared are. In some embodiments, a similarity score may be determined and assigned to each pair. In some embodiments, a highest similarity score may be used to establish a link and possibly a weight between the intents being compared. In some embodiments, a journey is ultimately determined that starts with a starting intent that is most similar to the focus intent or an intent under consideration. In other embodiments, ranked journeys may be presented to the user (in the use phase), ranked by the similarity score with their respective starting intents. The number of possible (high ranking) user journeys that are presented to the user may be based on a predefined number of user journeys. For example, a predefined variable may indicate that the top five possible user journeys, based on a highest ranked order of degrees of similarity between the journeys' respective starting intents may be presented to the user. The user 592 may then select one of the ranked journeys.

The cosine similarity may be utilized as the similarity score that is a measure of similarity between two non-zero vectors of an inner product space that measures the cosine of the angle between them. The cosine of 0° is 1, and it is less than 1 for any angle in the interval (0, π] radians. It is thus a judgment of orientation and not magnitude: two vectors with the same orientation have a cosine similarity of 1, two vectors oriented at 90° relative to each other have a similarity of 0, and two vectors diametrically opposed have a similarity of −1, independent of their magnitude. The cosine similarity is particularly used in positive space, where the outcome is neatly bounded in [0,1]. The name derives from the term "direction cosine": in this case, unit vectors are maximally "similar" if they're parallel and maximally "dissimilar" if they're orthogonal (perpendicular). This is analogous to the cosine, which is unity (maximum value) when the segments subtend a zero angle and zero (uncorrelated) when the segments are perpendicular. These bounds apply for any number of dimensions, and the cosine similarity is most commonly used in high-dimensional positive spaces. For example, in information retrieval and text mining, each term is notionally assigned a different dimension and a document is characterized by a vector where the value in each dimension corresponds to the number of times the term appears in the document. Cosine similarity then gives a useful measure of how similar two documents are likely to be in terms of their subject matter.

Similar stored intents 514 stored in the journey database 510 may be linked together to form stored journeys 512, and a given intent may be used in multiple journeys, and, in some embodiments, an initial weighting associated with a link between two intents may be determined by the calculated degree of similarity.

FIG. 6 is a graph illustrating an example, according to some embodiments, of an SME manually-created journey 600, described above, as a collection of nodes 602a-602d (collectively or representatively 602) (that are also referenced herein as intents $I_x$ that may include associated answer units) that are connected to each other by links 604a-604c (collectively or representatively 604) that have associated weighting factors 606a-606c $W_x$ (collectively or representatively 606). A threshold can be set that is used to activate or deactivate a journey link or to cause the node 602 to fire. This weight $W_x$ 606 may be decayed across the graph (the journey 606) to prevent linking all answer units/intents $I_x$ 602. Each intent $I_x$ 602 node may also contain an activation weight $W_x$ 606 generated by the links 604 but that can optionally be initially set by the SME 590. As the system is trained (and used), the weights $W_x$ 606 may be modified to adapt and evolve the journey 600 neural net. Weights $W_x$ 606 falling below a certain weight threshold may be considered essentially non-existent and effectively disconnect the intent linkages in a journey. FIG. 6 may illustrate, for example, the User 1 Use Case described above. As new content (e.g., in the form of intents $I_x$ 602) is added/updated, the scoring to determine the relationships between the intents $I_x$ 602 and respective weights $W_x$ 606 may update to build new or update current journey maps 600 (512).

Figure 7:
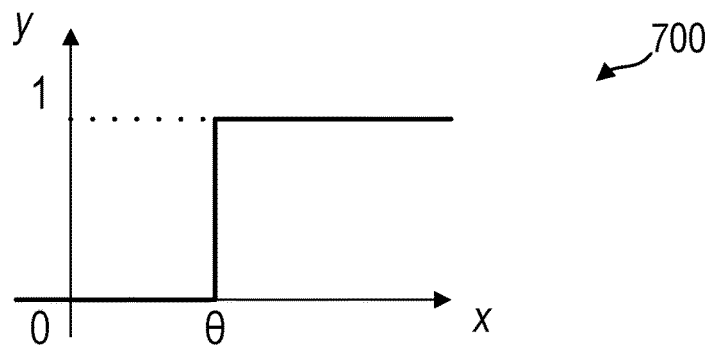
FIG. 7 is a graph illustrating a unit step function.

FIG. 7 is a graph illustrating a unit step function 700, where the x-axis represents a score and the y-axis represents the output of an intent $I_x$ 602 node in the journey 600. The output of the intent $I_x$ 602 remains zero for values less than the threshold value θ, at which point the output becomes one. As an example, the unit step function 700 may be used determine if the combined score between different intent $I_x$ 602 answer units and the applied weight(s) $W_x$ 606 based on previous actions of the user 592 and/or potentially other users' 594 (for example, if there are no previous actions of the user 592) interactions is enough to activate a user journey 600 (or portion thereof) or not.

Use Phase

Once the initial training phase is complete, the conversation system 500 may then be operated in the use phase. Conceptually, the use phase may be broken down into a first use phase, during which the other users 594 interact with the conversation system 500, and the second use phase, during which the (focus) user 592 interacts with the conversation system 500—this distinction is helpful for illustrating various aspects of the system's operation.

Figure 8:
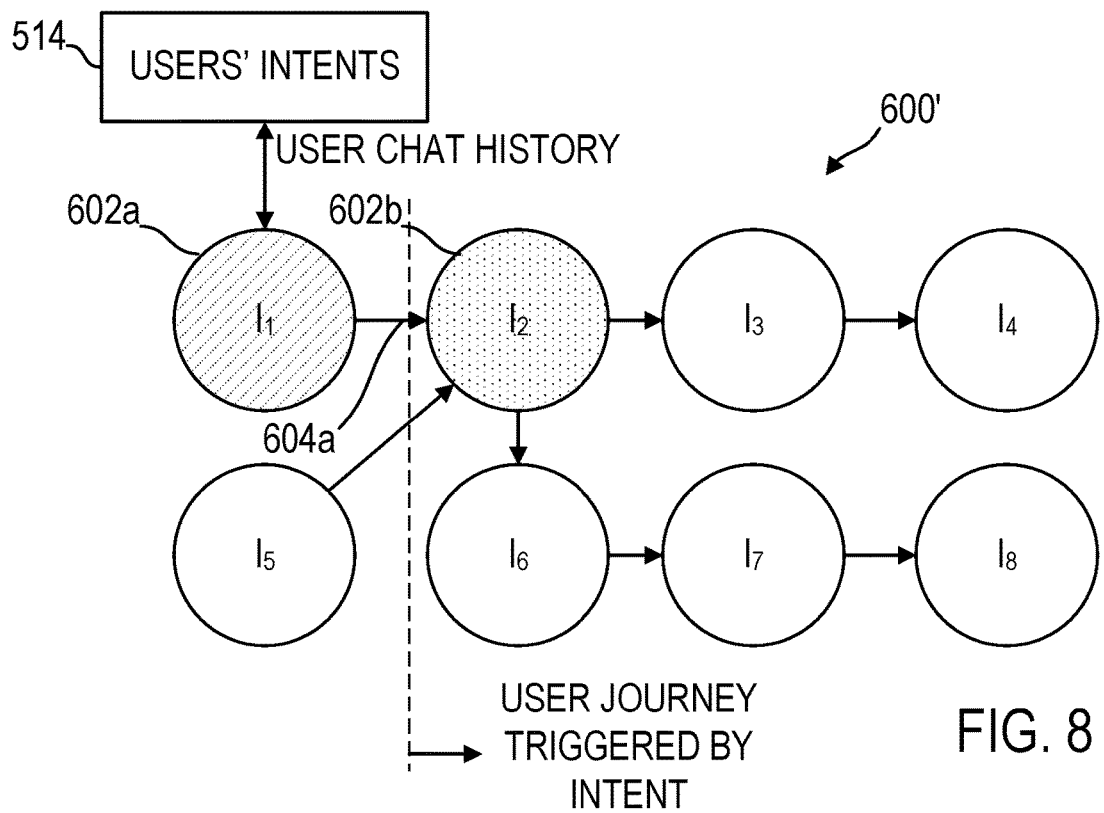
FIG. 8 is a graph of a user journey showing, in the use phase, a user submitting a question to the conversation system, according to some implementations.

FIG. 8 is a graph of a user journey 600' showing, in the use phase, a user 592 submitting a question to the conversation system 500 which may determine an answer through e.g., a normal machine learning processes, to identify an intent $I_1$ 602a for the user question. From the identified intent $I_1$ 602a, the conversation system 500 may determine, using the intent similarity determiner 550 as described above, if the relatedness score to another intent is enough to activate any of the journeys 600' based on the SME's 590 created journeys during the training phase and other users' interactions with the system 500. FIG. 8 illustrates a journey 600' located in the stored journeys 512 stored in the user journey database 510 that begins with the intent $I_2$ 602b.

In some embodiments, where there is no previous users' history for a particular intent, the system may not be able to activate a journey based on only one question. In some embodiments, the conversation system 500 may add the intent $I_1$ 602a to the user intent 514 history. By tracking how the user 592 and other users 594 use this intent, links, weights, and journeys, may be created or modified as a result. In some embodiments, the conversation system 500 may be able to identify a journey 600' (from the stored journeys 512 stored in the user journey database 510) after multiple interactions.

FIG. 8 also shows a different intent $I_5$ for which the intent similarity determiner 550 has determined that the relatedness score indicates a degree of relatedness to activate the same user journey 600' (that begins with intent $I_2$) as the intent $I_1$ did. At each interaction between the user 592 and the conversation system 500, various weights $W_x$ 606 between intents $I_x$ 602 for the stored journeys 512 in the conversation system 500 may be adjusted based on, e.g., a calculated distance or similarity between the topics (stored intents 514) and user 592 interactions with the conversation system 500.

When an existing user 592 asks another question or returns after many other users 594, the conversation system 500 may determine the answer through a normal machine learning processes to identify an intent of the user 592 from the information contained within the user question. From the identified intent, the intent similarity determiner 550 may determine if the similarity score between the identified intent of the user 592 and any of the stored intents 514 is enough to activate any of the stored journeys 512 that are based on the stored intent 514 (the stored journeys 512, as noted above, may be based on the SME-created journeys via the SME journey creator 520, conversation system created journeys via the journey creator/modifier 560, and other users' 594 interactions with the conversation system 500. The system 500 may thus activate or suggest a journey here based on predefined weights set by the SME. As the user 592 interacts more, the system may better determine what the user 592 wants. Intent $I_1$ 602a, shown in diagonal crosshatch, illustrates the first user 592 interaction with the conversation system 500. At this point in time, the system 500 fails to suggest the next topic $I_2$ 602b due to insufficient confidence.

Figure 9:
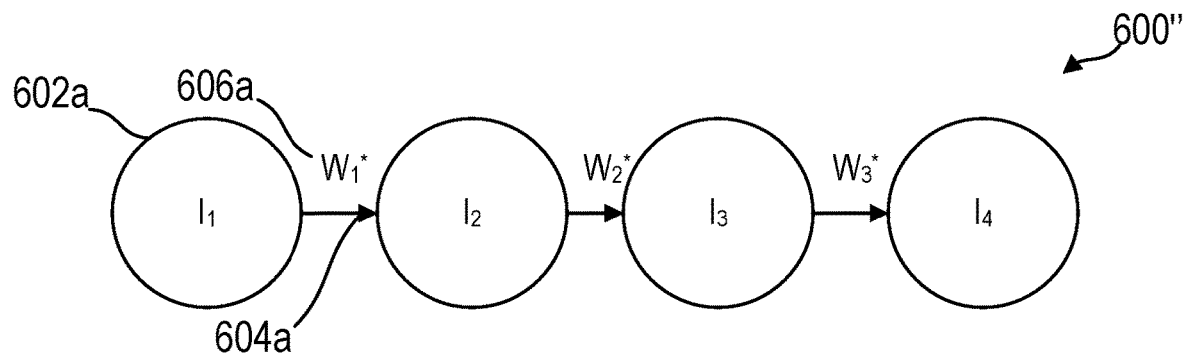
FIG. 9 is a graph of a journey similar to FIG. 7, but that illustrates updated weights $W_x^*$, according to some implementations.

FIG. 9 is a sequence diagram of a journey 600" similar to FIG. 6, but that illustrates updated weights $W_x^*$ 606. At each interaction between the user 592 and the conversation system 500, weights for the stored journeys 512, i.e., weights between links of stored intents 514 may be adjusted based on the distance between the topics (intents) and user interactions with the system.

Figure 10:
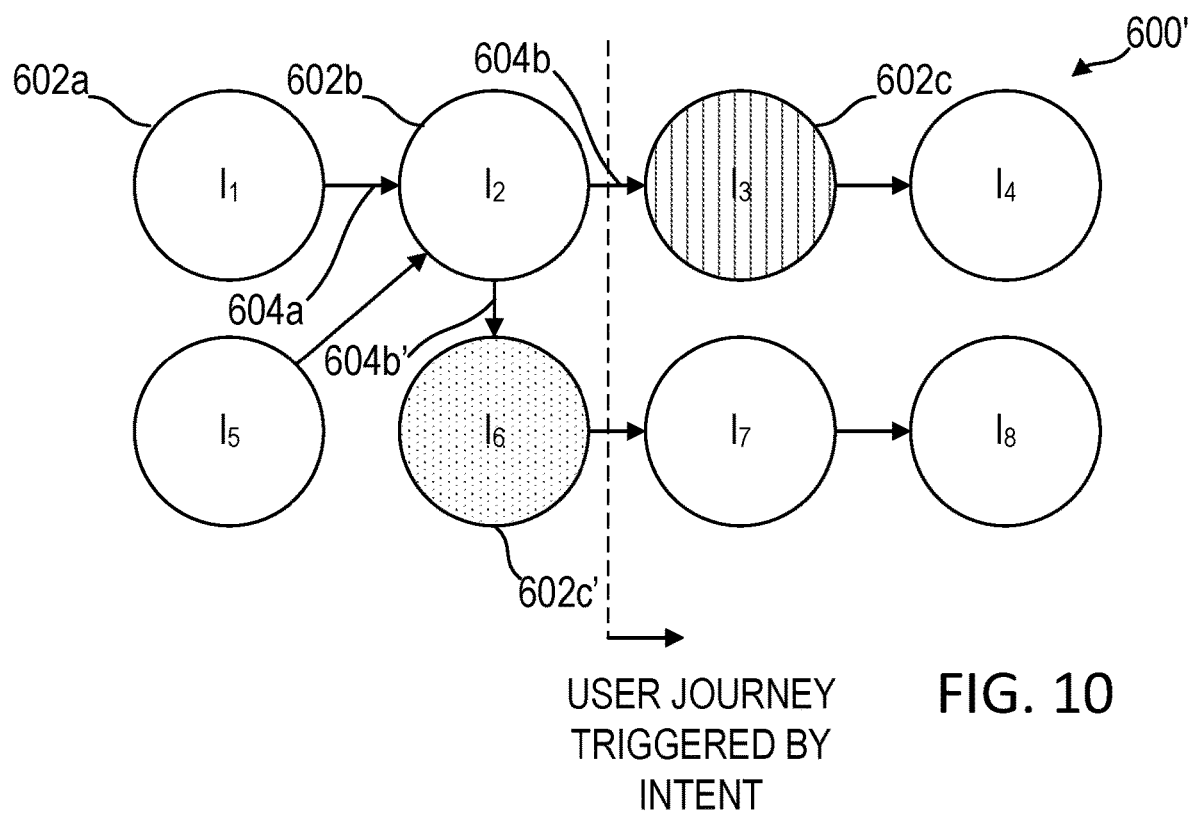
FIG. 10 is a graph of a user journey showing, in the use phase, a journey selection by the conversation system, according to some implementations.

FIG. 10 is a sequence diagram of a user journey 600' showing, in the use phase, a journey selection by the conversation system 500. For the user's 592 intent $I_2$ 602b, the intent similarity determiner 550 determines a closest similarity intent $I_3$ 602c, based on the higher linkage weight $W_x$ of the link 604b connecting intent $I_2$ and intent $I_3$. Thus, the journey comprising the intent $I_3$ and the intent $I_4$ is selected for the user to follow from the stored journeys 512, which reflects a higher confidence of the system. In contrast, the journey comprising the intents $I_6$-$I_8$ (602c' at the beginning of the journey) is not followed due to there being a lower degree of similarity (lower linkage weight $W_x$) for the link 604b' connecting the intents $I_2$ and $I_6$. In some implementations, the conversation system 500 may automatically determine and present the journey beginning with $I_3$ 602c to the user as the journey to pursue. However, in some implementations, the user 592 may be presented with a list of potential journeys, possibly sorted by degree of similarity or degree of likelihood based on the weightings/similarity, and the user 592 may select a journey to pursue from the list.

Changes to the user journey database 510 may be implemented through the weightings $W_x$ 606 assigned to the links 604 of the stored intents $I_x$ 602 (514). For example, in the use case above, if an attempt by the system to broaden out the "water switched on" intent to "new home process" intent are met with "no, just water", or "just utilities", the link 604 weightings 606 are adjusted. Over time, if this occurs multiple times, eventually the weightings 606 will be such that the "new home process" intent is no longer activated when the user presents an inquiry for the intent "water switched on". The system can also recognize if users 592 are expanding the journeys themselves. In the above use case, if, in addition to users predominantly selecting the "new home process", and then frequently asking about newcomer activities, the system can add the newcomer activity intent to the stored intents 514, and add this intent to the new home process journey. Thus, the system dynamically evolves to present a user journey that reflects not only the original journey created by the SME 590, but also reflects how other users 594 have historically interacted with the conversation system 500.

Figure 11:
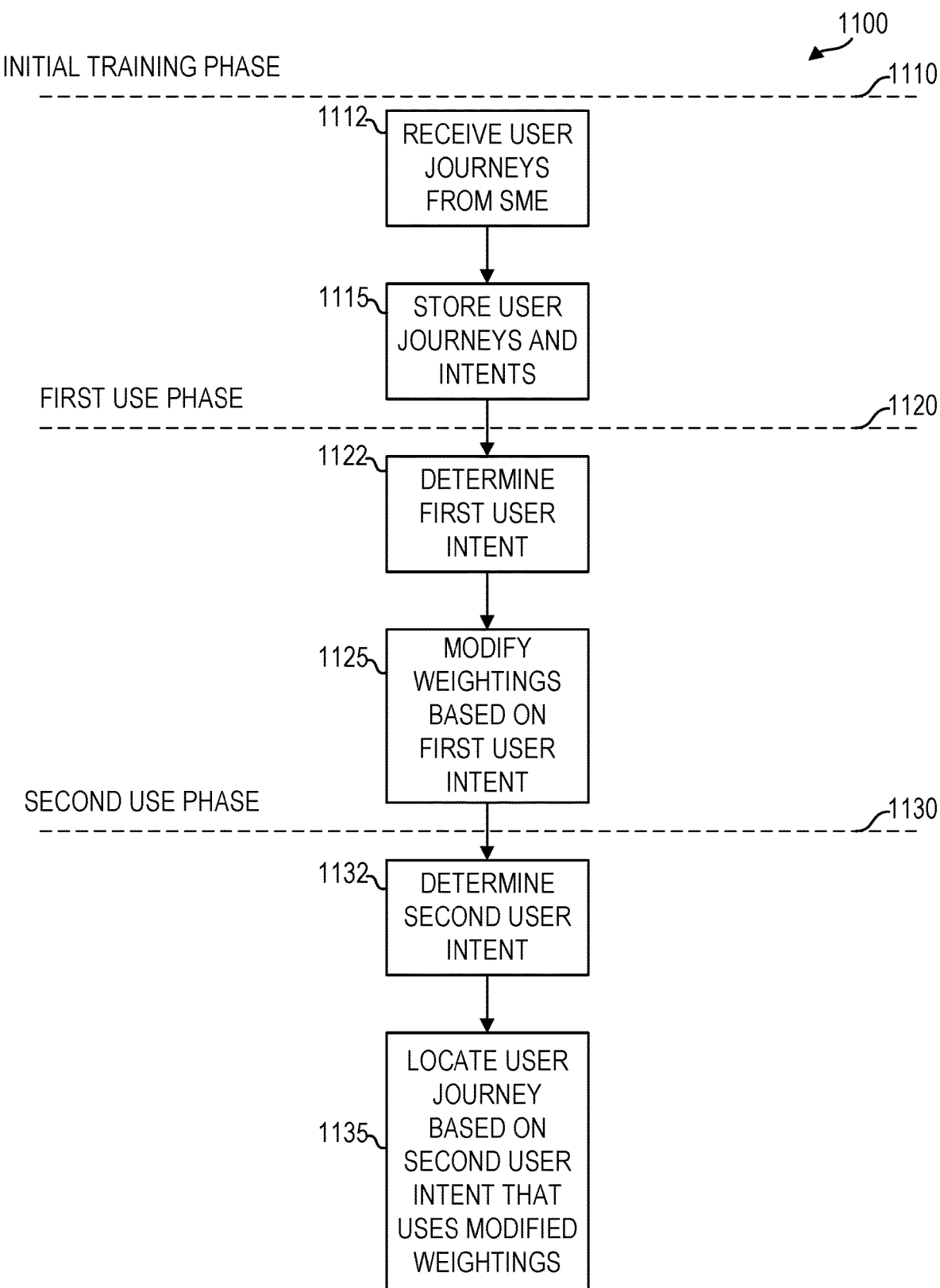
FIG. 11 is a flowchart illustrating a process that may be implemented by the conversation system, according to some implementations.

FIG. 11 is a flowchart illustrating an example process 1100 that may be utilized by the conversation system 500 described herein. The process 1100 may be divided into the initial training phase 1110, the first use phase 1120, and the second use phase 1130. In the initial training phase 1110, the SME 590 may create user journeys 512, using, for example, the SME journey creator 520. The journeys 512 may be created by linking together intents 514 and applying weights to links that may be indicative of a likelihood that the intents 514 may be followed by a user 590, 592 of the journey 512. These journeys, in operation 1112 may be received from the SME 590, and in operation 1115, stored in the user journey database 510. In some embodiments, the journey creator/modifier 560 may create the user journeys 512 that are stored in the user journey database 510 by linking related intents 514 together.

Once a number of journeys 512 and intents 514 have been stored in the user journey database 510, in a first use phase 1120, an intent of a first user 594 may be determined in operation 1122. This first user intent 514 may be determined by utilizing the user questions receiver/parser 530 and the context determiner 540 from a user question. At least one or more of the weightings in the journeys 512 or with the linked intents 514 may be modified, based on the first user intent 512.

In a second use phase 1130, the conversation system 500 may, in operation 1132, determine a second user intent of a second (focus) user 592 utilizing the user question/receiver parser 530. In operation 1135, the conversation system 500 may locate a user journey 512 from the user journey database 510 that is based on the second user intent, the user journey 512 using weightings from the first use phase 1120 that had been previously modified in operation 1125. In some embodiments, the located user journey may be presented to the user 592 that has a highest likelihood that the user journey is the most relevant to the user 592. In some embodiments a list of ranked user journeys that are ranked in terms of having the highest likelihood of relevance to the user 592 may be presented to the user 592, and the user 592 may select from the presented ranked list of journeys which journey to follow.

Computer Technology and Computer Readable Media

The one or more embodiments disclosed herein accordingly provide an improvement to computer technology. For example, an improvement to a search engine allows for a more efficient and effective search for information by the user. The ability to access stored information with which the user has interacted with in some manner, and allowing the weighting of the importance of this information to decay over time beneficially improves the operation of the search and benefits the user in that more pertinent results may be presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, comprising, by a processor:
in an initial training phase:
storing a plurality of user journeys in a stored journey database (SJDB) located within a memory associated with the processor; and
storing a plurality of intents in a stored intents database (SIDB) located within the memory;
wherein the plurality of user journeys each comprise one or more links to one or more of the plurality of intents, wherein the links have associated weightings;
in a first use phase that is subsequent to the initial training phase:
determining a first intent of a first user or a second user; and
modifying a first weighting of the weightings based on the first intent;
in a second use phase that is subsequent to the first use phase:
receiving, from the second user, a second user input;
determining a second intent from the second user input;
locating a user journey from the plurality of user journeys in the SJDB related to the second intent; and
presenting, on a display device, the user journey to the second user;
wherein:
the user journey comprises at least two of the plurality of intents in the SIDB connected with a link having the modified first weighting; and
the locating of the user journey comprising:
disambiguating the user journey from an other user journey having overlapping components with the user journey based on: (a) a context of the first user, and (b) a context of the second user, wherein the overlapping components comprise a sub-journey of at least one of the user journey and the other user journey.

2. The method of claim 1, further comprising receiving, from a subject matter expert (SME), the plurality of user journeys.

3. The method of claim 1, wherein the locating of the user journey comprises:
locating the user journey having a highest degree of similarity between the second intent and a starting intent of the user journey.

4. The method of claim 3, further comprising determining the highest degree of similarity using a cosine similarity calculation.

5. The method of claim 3, wherein:
the locating of the user journey comprises locating a predefined number of user journeys having a highest ranked order of degrees of similarity between the second intent and starting intents of the respective predefined numbers of the user journeys; and
the presenting further comprises presenting, for user selection, the predefined number of user journeys.

6. The method of claim 1, further comprising:
determining a different intent based on the second intent and context;
presenting the different intent to the user; and soliciting a preference between the second intent and the different intent.

7. The method of claim 6, wherein the different intent is based on prior actions of other users.

8. The method of claim 6, wherein the different intent is a broader intent and is based on a word analysis of information provided by the user.

9. The method of claim 1, further comprising receiving, from the first user, a first user question, wherein the determining of the first intent is based on the first user question.

10. The method of claim 9, further comprising using text classification to determine the first intent from the first user question.

11. A conversation system, comprising:
a processor configured to:
in an initial training phase:
store a plurality of user journeys in a stored journey database (SJDB) located within a memory associated with the processor; and
store a plurality of intents in a stored intents database (SIDB) located within the memory;
wherein the plurality of user journeys each comprise one or more links to one or more of the plurality of intents, wherein the links have associated weightings;
in a first use phase that is subsequent to the initial training phase:
determine a first intent of a first user or a second user; and
modify a first weighting of the weightings based on the first intent;
in a second use phase that is subsequent to the first use phase:
receive, from the second user, a second user input;
determine a second intent from the second user input;
locate a user journey from the plurality of user journeys in the SJDB related to the second intent; and
present, on a display device, the user journey to the second user;
wherein:
the user journey comprises at least two of the plurality of intents in the SIDB connected with a link having the modified first weighting; and
in the locating of the user journey, the user journey is disambiguated from an other user journey having overlapping components with the user journey based on: (a) a context of the first user, and (b) a context of the second user, wherein the overlapping components comprise a sub-journey of at least one of the user journey and the other user journey.

12. The system of claim 11, wherein the location of the user journey comprises causing the processor to:
locate the user journey having a highest degree of similarity between the second intent and a starting intent of the user journey.

13. The system of claim 12, wherein the processor is further configured to determine the highest degree of similarity using a cosine similarity calculation.

14. The system of claim 12, wherein:
the location of the user journey comprises causing the processor to locate a predefined number of user journeys having a highest ranked order of degrees of similarity between the second intent and starting intents of the respective predefined numbers of the user journeys; and the presentation further comprises causing the processor to present, for user selection, the predefined number of user journeys.

15. The system of claim 11, wherein the processor is further configured to:
   determine a different intent based on the second intent and context;
   present the different intent to the user; and
   solicit a preference between the second intent and the different intent.

16. A computer program product for search modification system, the computer program product comprising a computer readable storage medium having computer-readable program code embodied therewith to, when executed on a processor:
   in an initial training phase:
      store a plurality of user journeys in a stored journey database (SJDB) located within a memory associated with the processor; and
      store a plurality of intents in a stored intents database (SIDB) located within the memory;
      wherein the plurality of user journeys each comprise one or more links to one or more of the plurality of intents, wherein the links have associated weightings;
   in a first use phase that is subsequent to the initial training phase:
      determine a first intent of a first user or a second user; and
      modify a first weighting of the weightings based on the first intent;
   in a second use phase that is subsequent to the first use phase:
      receive, from the second user, a second user question;
      determine a second intent from the second user question;
      locate a user journey from the plurality of user journeys in the SJDB related to the second intent; and
      present, on a display device, the user journey to the second user;
   wherein:
      the user journey comprises at least two of the plurality of intents in the SIDB connected with a link having the modified first weighting; and
      in the locating of the user journey, the user journey is disambiguated from an other user journey having overlapping components with the user journey based on: (a) a context of the first user, and (b) a context of the second user, wherein the overlapping components comprise a sub-journey of at least one of the user journey and the other user journey.

17. The computer program product of claim 16, wherein the instructions further cause the processor to:
   determine a different intent based on the second intent and context;
   present the different intent to the user; and
   solicit a preference between the second intent and the different intent.

18. The computer program product of claim 17, wherein the different intent is based on prior actions of other users.

19. The computer program product of claim 17, wherein the different intent is a broader intent and is based on a word analysis of information provided by the user.

20. The computer program product of claim 16, wherein the instructions further cause the processor to:
   receive, from the first user, a first user question, wherein the determining of the first intent is based on the first user question; and
   use text classification to determine the first intent from the first user question.

* * * * *